United States Patent
Horwitz

(10) Patent No.: US 8,870,488 B2
(45) Date of Patent: Oct. 28, 2014

(54) JOINT ASSEMBLY WITH REINFORCING MEMBER AND FOAM

(75) Inventor: David James Horwitz, Sandy Springs, GA (US)

(73) Assignee: Duracase Proprietary LLC, Atlanta, GA (US)

( * ) Notice: Subject to any disclaimer, the term of this patent is extended or adjusted under 35 U.S.C. 154(b) by 20 days.

(21) Appl. No.: 12/456,623

(22) Filed: Jun. 19, 2009

(65) Prior Publication Data

US 2010/0322703 A1    Dec. 23, 2010

(51) Int. Cl.
*A47C 5/12*     (2006.01)
*F16B 12/44*    (2006.01)
*A47C 5/08*     (2006.01)
*A47C 5/04*     (2006.01)

(52) U.S. Cl.
CPC . *F16B 12/44* (2013.01); *A47C 5/12* (2013.01); *A47C 5/08* (2013.01); *A47C 5/04* (2013.01)
USPC ........................................... 403/265; 403/295

(58) Field of Classification Search
USPC ................... 403/205, 265, 292, 295, DIG. 13
See application file for complete search history.

(56) References Cited

U.S. PATENT DOCUMENTS

| | | | | |
|---|---|---|---|---|
| 2,387,335 A * | 10/1945 | Leonard | .......................... | 428/612 |
| 3,126,595 A * | 3/1964 | Dewey et al. | .................... | 164/23 |
| 3,164,309 A * | 1/1965 | Thompson et al. | ............. | 223/66 |
| 3,753,817 A * | 8/1973 | Geissler et al. | .................. | 216/55 |
| 3,970,401 A * | 7/1976 | Lubeck | .......................... | 403/265 |
| 4,131,314 A | 12/1978 | Knapp | | |
| 5,030,488 A * | 7/1991 | Sobolev | ........................ | 428/35.9 |
| 5,067,842 A * | 11/1991 | Ponting | ......................... | 403/265 |
| 5,383,740 A * | 1/1995 | Lancelot, III | ................. | 403/267 |
| 5,630,745 A * | 5/1997 | Yeh | ................................ | 446/374 |
| 5,660,492 A * | 8/1997 | Bathon | .......................... | 403/267 |
| 5,715,643 A * | 2/1998 | Parkinson | ..................... | 52/656.9 |
| 5,957,536 A | 9/1999 | Sullivan | | |
| 6,200,061 B1 * | 3/2001 | Goto | ............................. | 403/268 |
| 6,503,426 B1 * | 1/2003 | Horwitz | ........................ | 264/46.5 |
| 6,746,303 B2 * | 6/2004 | Beidokhti | ...................... | 446/374 |
| 7,445,400 B2 * | 11/2008 | Takeuchi | ....................... | 403/292 |
| 7,506,859 B2 * | 3/2009 | Keller et al. | ............... | 256/65.14 |
| 2004/0032156 A1 * | 2/2004 | Stipek | ........................ | 297/452.18 |
| 2005/0169893 A1 * | 8/2005 | Koblish et al. | ............... | 424/93.7 |
| 2005/0214340 A1 * | 9/2005 | Erbe et al. | ...................... | 424/423 |
| 2006/0059807 A1 * | 3/2006 | Zimmerman et al. | .......... | 52/239 |
| 2007/0281523 A1 * | 12/2007 | Riley | ............................. | 439/157 |
| 2009/0016894 A1 * | 1/2009 | Strother | .................... | 416/241 R |
| 2009/0256482 A1 * | 10/2009 | Powell | ........................... | 315/51 |

FOREIGN PATENT DOCUMENTS

GB        1325622 A      8/1973

* cited by examiner

*Primary Examiner* — Joshua Kennedy
(74) *Attorney, Agent, or Firm* — J. Bennett Mullinax, LLC

(57) ABSTRACT

First and second joint members are connected to one another. A reinforcing member that has an outer surface that defines a plurality of cavities is located in at least one of the joint members. Foam is located in the joint members and engages the reinforcing member and is located in the cavities of the reinforcing member.

8 Claims, 3 Drawing Sheets

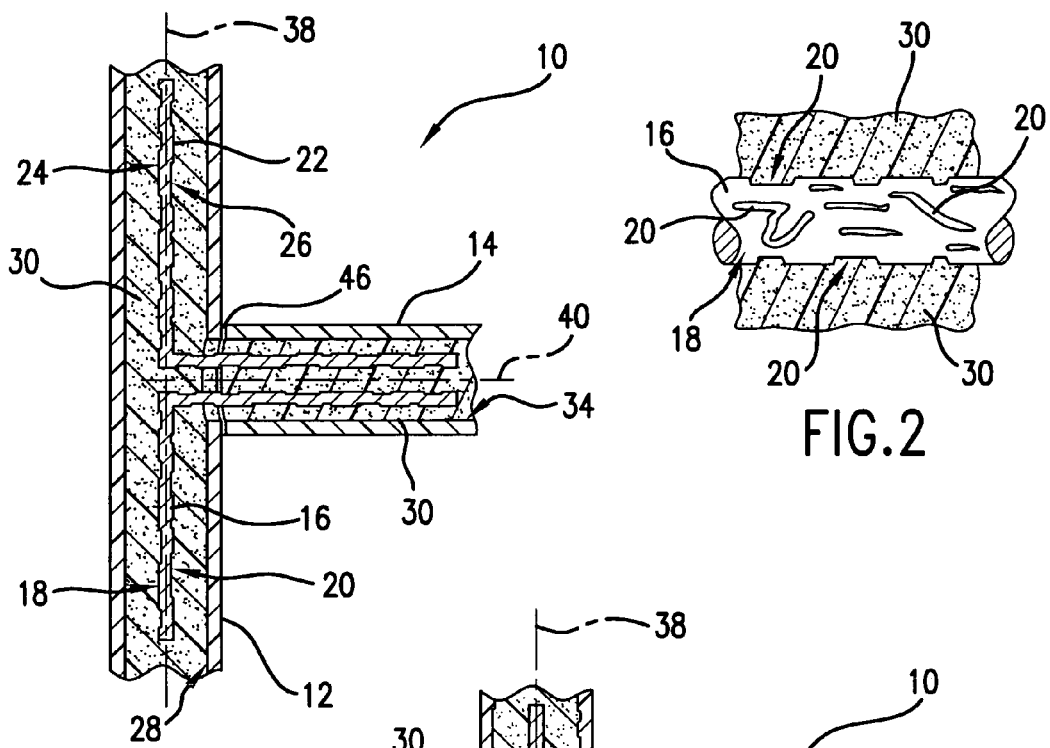
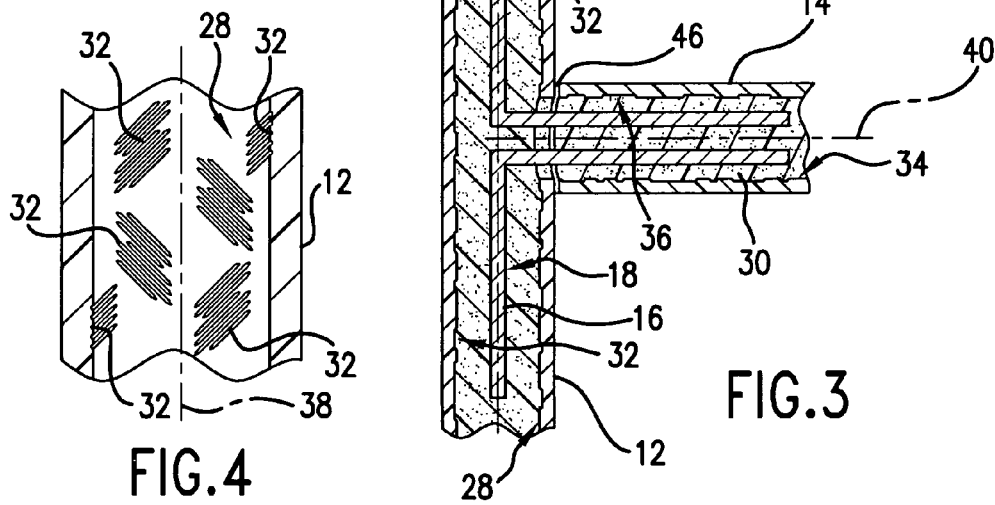

US 8,870,488 B2

JOINT ASSEMBLY WITH REINFORCING MEMBER AND FOAM

FIELD OF THE INVENTION

The present invention relates generally to joint assemblies that are strengthened with a reinforcing member and foam. More particularly, the present application involves a joint assembly that demonstrates improved strength through increased adhesion between the foam and other components of the joint assembly. Also, a method of forming a joint assembly is provided.

BACKGROUND

Various structures found in society, for example furniture, employ joints in their construction. Furniture is made in a variety of shapes and from a variety of different materials. Furniture may be made from wood or metal in addition to being made of less traditional materials such as plastic. While providing advantages such as cost, the use of plastic in furniture challenges the furniture designer in assuring the resulting product is both structurally sound and aesthetically pleasing.

Joint assemblies in furniture that are made from non-traditional material typically include two members that are connected to one another. The first member may be tubular shaped and may be the leg of a chair while the second member is also tubular in shape and is a cross-support of the chair. The cross-support may be attached to the leg at a right angle to form a T-shaped joint. The cross-support is usually shaped on one end for mating with the leg and is attached thereto though the use of an adhesive. Although the leg and cross-support may be solid members, it is sometimes the case that these components are hollow such as when polyvinyl chloride tubing is employed. Here, the leg and cross-support are tubular components that have smooth inner surfaces.

Joint assemblies as the ones described are usually reinforced in order to withstand stresses that are imparted thereon during use. A reinforcing member, such as a wire, may be located inside of the hollow interiors of the leg and cross-support and urged against their interior surfaces. Additionally, liquid polyurethane foam may be introduced into the hollow interiors of the leg and cross-support to cover the reinforcing member. The liquid polyurethane foam expands and hardens into a rigid structure when set. In alternative arrangements, the polyurethane foam employed may not be completely rigid when set in order to make the resulting joint assembly less susceptible to damage by impact forces. The reinforcing member and polyurethane foam work in combination to strengthen the joint assembly to prevent damage when forces are applied thereto.

It is sometimes the case that reinforced joint assemblies as the ones previously described fail during use. It may be that the polyurethane foam becomes separated at one or more locations to the inner surfaces of the leg and cross-support. Also, the polyurethane foam may separate from the reinforcing member. Separation of the polyurethane foam may be caused through normal use of the furniture or through the application of other more significant forces on the joint assembly. Lack of adhesion between the foam and the inner surfaces and/or reinforcing member can lead to failure of the joint assembly as the components will no longer function as intended so that stress concentrations will occur at certain locations. As such, there remains room for variation and improvement within the art.

SUMMARY

Various features and advantages of the invention will be set forth in part in the following description, or may be obvious from the description, or may be learned from practice of the invention.

The present invention provides for a joint assembly for use in structures such as furniture. The joint assembly may include first and second joint members that are made from less conventional materials such as plastic. The joint assembly may include one or more reinforcing members that are present in the joint members. Foam, such as polyurethane foam, may also be inserted into the joint members for strengthening the joint assembly. The joint assembly is designed so that increased adhesion is realized between the foam and the joint members and/or reinforcing members. Methods of construction and treatment of the joint assembly are also disclosed that result in having a higher degree of adhesion between these components.

In accordance with one exemplary embodiment of the present invention, a joint assembly is provided that includes a first joint member and a second joint member that are connected to one another. A reinforcing member is present and is located in both the first and second joint members. The reinforcing member has an outer surface that defines a plurality of cavities. Foam is located in both the first and second joint members and engages the reinforcing member so that foam in located in the cavities of the reinforcing member.

Another exemplary embodiment resides in a joint assembly as immediately discussed in which the reinforcing member is a wire. The wire is acid etched in order to form the cavities. Acid etching of the wire lowers the dielectric value of the wire in order to promote wetting of the foam.

The present invention also provides for a joint assembly that has a first joint member with an inner surface that defines a plurality of cavities. A second joint member is present and is connected to the first joint member. A reinforcing member and foam are located in both the first and second joint members. The foam engages the inner surface of the first joint member so that the foam is located in the cavities of the first joint member.

The present invention also provides for a joint assembly as immediately discussed in which the cavities are formed by running a rough object over the surface of the first joint member.

Another exemplary embodiment of the present invention exists in a joint assembly as discussed above in which the first joint member is a tube. The cavities are grooves that extend in the axial direction of the first joint member and have rounded dovetail shaped cross-sections. In a further embodiment, the cavities may extend around the entire inner circumference of the inner surface of the first joint member. The cavities have a radial depth of at least 1/10 millimeters. The cavities also have a circumferential width at the location of the cavities closest to the axis of the first joint member of at least 1 millimeter.

A further exemplary embodiment of the joint assembly exists as discussed above in which the second joint member has an inner surface that defines a plurality of cavities. The foam engages the inner surface of the second joint member such that the foam is located in the cavities of the second joint member.

The present invention also provides for a method of manufacturing a joint assembly in which first and second joint members with inner surfaces are provided. The dielectric value of the inner surface of the first joint member is lowered. A reinforcing member is positioned in the first and second joint members. The joint members are connected and foam is applied to the inner surface of the first joint member.

An additional embodiment of the present invention exists in a method as immediately discussed in which the step of lowering the dielectric value of the inner surface of the first joint member is accomplished by treating this surface with an electric current.

A further embodiment of the present invention resides in a method as previously discussed in which the step of lowering the dielectric value of the inner surface of the first joint member is accomplished by treating this surface with a solvent for polyvinyl chloride.

The present invention also provides for a method as previously discussed where the step of lowering the dielectric value of the inner surface of the first joint member is accomplished by treating this surface with an etching primer for polyvinyl chloride.

The present invention also provides for a joint assembly that has a first joint member connected to a second joint member. The joint members each have an inner surface. The first joint member is made from materials that include at least polyvinyl chloride and polyurethane. A reinforcing member and polyurethane foam are located in both the first and second joint members. The polyurethane foam engages the inner surfaces of the first and second joint members.

Another exemplary embodiment resides in a joint assembly as immediately discussed in which the second joint member is made from materials that include at least polyvinyl chloride and polyurethane.

An additional exemplary embodiment of the present invention exists in a joint assembly as discussed above in which the ratio of polyvinyl chloride to polyurethane in the first joint member is 95 parts polyvinyl chloride to 5 parts polyurethane.

A method of manufacturing a joint assembly is also provided with respect to one aspect of the present invention. The method includes providing first and second joint members with inner surfaces. The inner surface of the first joint member is heated and a reinforcing member is positioned in both of the joint members. The joint members are connected to one another and foam is applied to the inner surface of the first joint member.

The present invention also provides for a method as immediately discussed in which the heating step is accomplished by passing the inner surface of the first joint member over a heating rod that produces a flame. Heating of the inner surface of the first joint member changes the surface tension of the inner surface.

An additional aspect of the present invention exists in a method as discussed above in which the first joint member, second joint member and reinforcing member are heated to a temperature of 107° Fahrenheit.

These and other features, aspects and advantages of the present invention will become better understood with reference to the following description and appended claims. The accompanying drawings, which are incorporated in and constitute part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended Figs. in which:

FIG. 1 is a cross-sectional view of a joint assembly in accordance with one exemplary embodiment of the present invention.

FIG. 2 is a close up plan view of a portion of the joint assembly of FIG. 1.

FIG. 3 is a cross-sectional view of a joint assembly in accordance with another exemplary embodiment.

FIG. 4 is a cross-sectional view that shows cavities on the inner surface of the first joint member in accordance with one exemplary embodiment.

Figure 5:
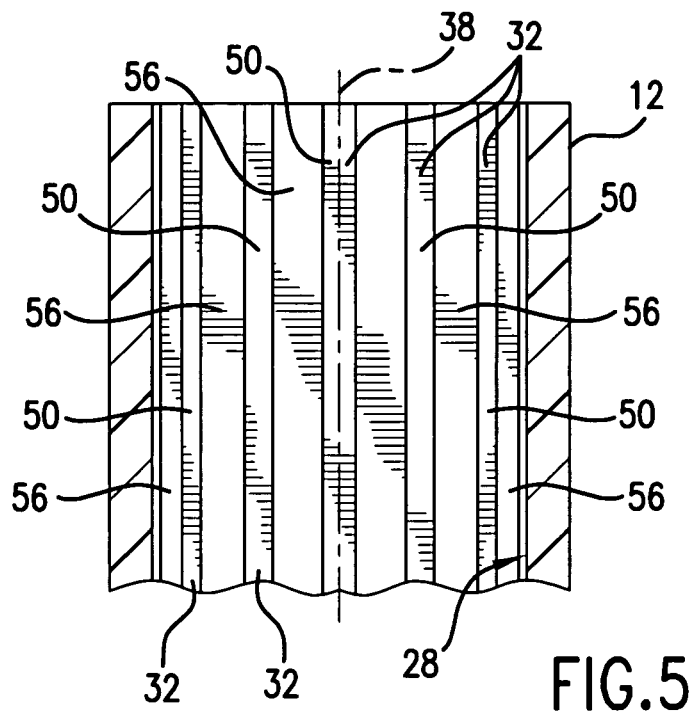
FIG. 5 is a cross-sectional view of the first joint member taken along line 5-5 of FIG. 6.

Repeat use of reference characters in the present specification and drawings is intended to represent the same or analogous features or elements of the invention.

DETAILED DESCRIPTION OF REPRESENTATIVE EMBODIMENTS

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

It is to be understood that the ranges mentioned herein include all ranges located within the prescribed range. As such, all ranges mentioned herein include all sub-ranges included in the mentioned ranges. For instance, a range from 100-200 also includes ranges from 110-150, 170-190, and 153-162. Further, all limits mentioned herein include all other limits included in the mentioned limits. For instance, a limit of up to 7 also includes a limit of up to 5, up to 3, and up to 4.5.

The present invention provides for a joint assembly 10 that includes a reinforcing member 16 surrounded by foam 30 and contained in a pair of joint members 12 and 14. The joint assembly 10 is designed to achieve improved adhesion between the foam 30 and the reinforcing member 16 and/or the joint members 12 and 14. Improved adhesion between the foam 30 and other components of the joint assembly 10 acts to create a joint assembly 10 that is less susceptible to failure. Increased adhesion may be realized by creating cavities 20 and 32 which increase the available surface area for contact between the foam 30 and the reinforcing member 16 and joint member 12. Further exemplary embodiments exist in which adhesion is increased through lowering the dielectric value of one or more of the components to promote wetting and hence better adhesion of the foam 30. Additional exemplary embodiments are disclosed in which certain materials are employed to result in improved adhesion. Likewise, various methods of manufacturing the joint assembly 10 exist in order to promote increased adhesion by, for example, increasing the surface tension of the surface to which the foam 30 is applied.

FIG. 1 shows a joint assembly 10 in accordance with one exemplary embodiment of the present invention. The joint assembly 10 may be constructed from a first joint member 12 and a second joint member 14 that are made of polyvinyl chloride. The joint assembly 10 can be used in the construction of furniture, although the joint assembly 10 of the present invention may be used in other structures such as overhead frames, automobiles or retaining walls. It is to be understood that the materials of construction and applications of the joint assembly 10 as disclosed herein are only exemplary and other materials and uses are possible.

The joint assembly 10 of FIG. 1 may be incorporated into a chair. Here, the first joint member 12 may be a leg of the chair while the second joint member 14 is a cross-support. T-joint assemblies as the one shown are generally known in the art. For example, U.S. Pat. No. 5,067,842 to Ponting discloses a joint assembly of a T-shaped design that may be used in the construction of furniture. U.S. Pat. No. 5,067,842 is incorporated by reference herein in its entirety for all purposes. The first joint member 12 in FIG. 1 is a tube that has an inner surface 28 with a bore therethrough. The second joint member 14 is also a tube that has an inner surface 34 that likewise defines a through bore. An axis 38 of the first joint member 12 is perpendicular to an axis 40 of the second joint member 14. Although shown as tubes, the first and second joint members 12 and 14 may be variously configured in other embodiments. For example, the first and second joint members 12 and 14 may be curved or may have cross-sections in the shape of a square, rectangle, triangle, I-beam, or channel. The first and second joint members 12 and 14 may be connected to one another through use of an adhesive 46. In alternative arrangements, the first and second joint members 12 and 14 can be connected together through a snap-fit arrangement or through the use of mechanical fasteners. Alternatively, the first and second joint members 12 and 14 may be integrally formed with one another in other embodiments.

The interior of the first and second joint members 12 and 14 are in communication with one another. A reinforcing member 16 is located in the interior of the first joint member 12 and extends into the interior of the second joint member 14. The reinforcing member 16 may be wire and may assume a variety of shapes. For example, the reinforcing member 16 may be sinusoidal or may be bent at several right angles in other embodiments. The reinforcing member 16 may be made of a variety of materials and need not be a wire in accordance with other exemplary embodiments. Foam 30, which may in one embodiment be polyurethane foam, is inserted into the interiors of the first and second joint members 12 and 14 and allowed to set. The foam 30 fills the joint members 12 and 14 and acts in cooperation with the reinforcing member 16 to strengthen the joint assembly 10.

FIG. 2 is a close up plan view of a portion of the joint assembly 10 of FIG. 1 that shows the reinforcing member 16 in more detail. Here, a plurality of cavities 20 are defined on the outer surface 18 of the reinforcing member 16. The presence of the cavities 20 acts to increase the surface area of the reinforcing member 16 and hence provide more area for contact with the foam 30. The foam 30 can exhibit increased adhesion to the reinforcing member 16 through an increase in the available area with which to contact the reinforcing member 16. The cavities 20 can be provided in any number and in any shape or depth. The cavities 20 may be provided around the entire outer circumference of the reinforcing member 16 so that this portion of the reinforcing member 16 extends from the first joint member 12 into the second joint member 14. As shown, the foam 30 surrounds the reinforcing member 16 and fills the cavities 20. The foam 30 across the displayed portion of the reinforcing member 16 in FIG. 2 is not shown for sake of clarity, although it is to be understood that foam 30 may fill the cavities 20 on this portion as well.

The cavities 20 can be constructed in a variety of manners. In one embodiment, the cavities 20 are made by running a rough object, such as sandpaper, over the outer surface 18. Additionally or alternatively, the reinforcing member 16 may be treated with an acid solution that etches the outer surface 18 so as to create cavities 20 to result in an increase in surface area. Etching by acid also drops the dielectric value of the reinforcing member 16 which promotes wetting of the foam 30. This change in dielectric value further enhances adhesion between the foam 30 and the reinforcing member 16.

The joint assembly 10 also includes a second reinforcing member 22 as shown in FIG. 1. The second reinforcing member has an outer surface 24 that defines a plurality of cavities 26. Cavities 26 are present for increasing the adhesion between the second reinforcing member 22 and the foam 30. The number and configuration of cavities 26 may be provided in the same manner as discussed above with respect to cavities 20. Likewise, cavities 26 may be formed in the same fashion as mentioned in regards to cavities 20. Although described as including reinforcing members 16 and 22 with cavities 20 and 26, it is to be understood that only one of the reinforcing members 16 or 22 may be provided with cavities in accordance with various exemplary embodiments. In this regard, the reinforcing member 16 may include cavities 20 while the outer surface 24 of the second reinforcing member 22 lacks cavities 26. Additionally, it is to be understood that the joint assembly 10 need not have a second reinforcing member 22 in other embodiments.

The joint assembly 10 can also be designed in order to promote stronger adhesion between the foam 30 and the joint members 12 and 14. FIG. 3 shows one such embodiment in which the inner surface 28 of the first joint member 12 defines a plurality of cavities 32. FIG. 4 is a cross-sectional view of the first joint member 12 that shows the cavities 32 in greater detail. The cavities 32 are provided in any number, shape, or depth. The cavities 32 may be formed by running a rough object, such as sand paper or a wire brush, over the inner surface 28. As FIG. 4 demonstrates, the cavities 32 can be aligned in multiple directions and be of various shapes, although in other embodiments the cavities 32 can be uniform in size, orientation and depth. The cavities 32 act to increase the available surface area of the first joint member 12 so that the foam 30 has a larger area of contact with the first joint member 12. This increase in surface area creates stronger adhesion between the foam 30 and the first joint member 12.

The second joint member 14 may also have an inner surface 34 that defines a plurality of cavities 36 as shown in FIG. 3. The cavities 36 function to increase the available surface area of the second joint member 14 so that the foam 30 can better adhere thereto. The cavities 36 can be formed and arranged in the same manner as described above with respect to the cavities 32 of the first joint member 12. The cavities 32 and 34 may be provided around the entire inner circumference of the joint members 12 and 14 such that the cavities 32 and 34 are present from the first joint member 12 through the transition into the second joint member 14. The joint assembly 10 can be provided with both cavities 32 and 36, or the joint assembly 10 may have one set of cavities 32 or 36 and not the other. When provided with both sets of cavities 32 and 36, the cavities 32 and 36 may be formed in the same manner and provided in the same number, size, shape and depth. Alternatively, the manner of production of the cavities 32 and 36 in addition to their other characteristics may be different in other exemplary embodiments. The reinforcing members 16 and 22 are not provided with cavities 20 and 26. However, in other embodiments, the cavities 20 and/or 26 may be present so that the resulting joint assembly 10 has increased adhesion of foam to the joint members 12 and 14 as well as to the reinforcing members 16 and/or 22.

Figure 6:
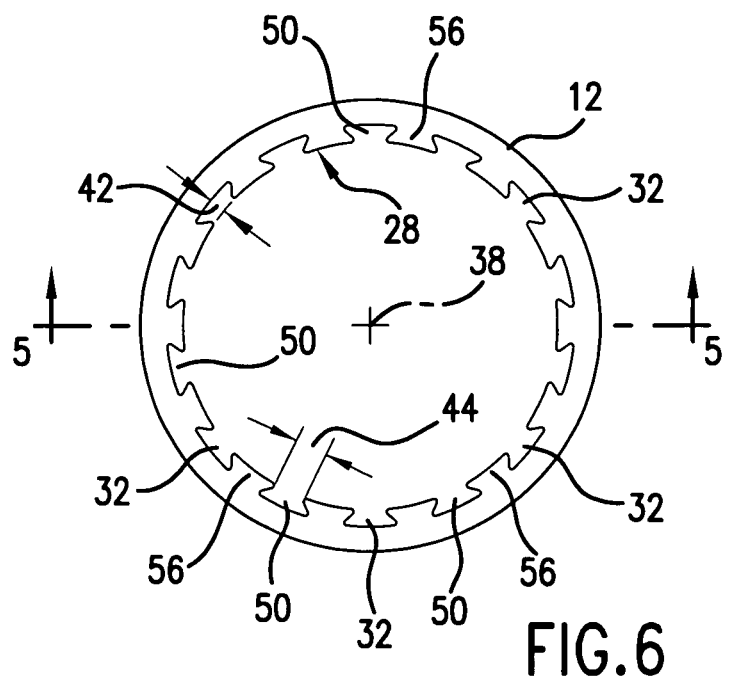
FIG. 6 is a top view that shows cavities arranged as grooves on the inner surface of the first joint member in accordance with another exemplary embodiment.

As stated, the cavities 32 can be configured in a variety of different manners and from a variety of different methods. FIGS. 5 and 6 show an embodiment of the first joint member 12 in which the cavities 32 are arranged as grooves 50 that extend in the direction of axis 38 of the first joint member 12. The grooves 50 extend around the entire inner circumference of the inner surface 28. In other embodiments, the grooves 50 extend around only a portion of the inner circumference of inner surface 28. The presence of grooves 50 acts to break the inner portion of the first joint member 12 into a plurality of protrusions 56.

The grooves 50 have a cross-section that is generally in the shape of a dove tail with rounded edges. The grooves 50 have a radial depth 42 of 1/10 millimeters. However, in other embodiments, the radial depth 42 may be from 1/50 millimeters to 1/2 millimeters, from 1/2 millimeters to 3/4 millimeters, or from 3/4 millimeters to 2 millimeters. The grooves 50 also have a circumferential width 44 of 1 millimeter at a location of the groove 50 that is closest to the axis 38. In other embodiments, the circumferential width 44 of the groove 50 at a location closest to the axis 38 may be up to 1 millimeter in length or up to 2 millimeters in length. Further, although described as having a generally dove tail shaped cross-section; the groove 50 may have various cross-sectional shapes in other embodiments. For instance, the cross-section of the groove 50 may be square, rectangular, triangular or oval.

The portion of the first joint member 12 on either side of the portion of the groove 50 closest to the axis 38 is rounded. The grooves 50 act to increase the surface area of the first joint member 12 that is available for contact with foam 30. Adhesion between the first joint member 12 and the foam 30 is increased as the foam 30 has a larger available surface area for contact. Although the grooves 50 have been described as being associated with the first joint member 12, it is to be understood that the cavities 36 of the second joint member 14 may also be configured as grooves 50 in the same manner as previously discussed with respect to the first joint member 12. Here, the grooves 50 extend in the direction of axis 40 of the second joint member 14. In some embodiments both the first and second joint members 12 and 14 are provided with grooves 50 while in other embodiments the grooves 50 are present on either the first joint member 12 or the second joint member 14.

Figure 7:
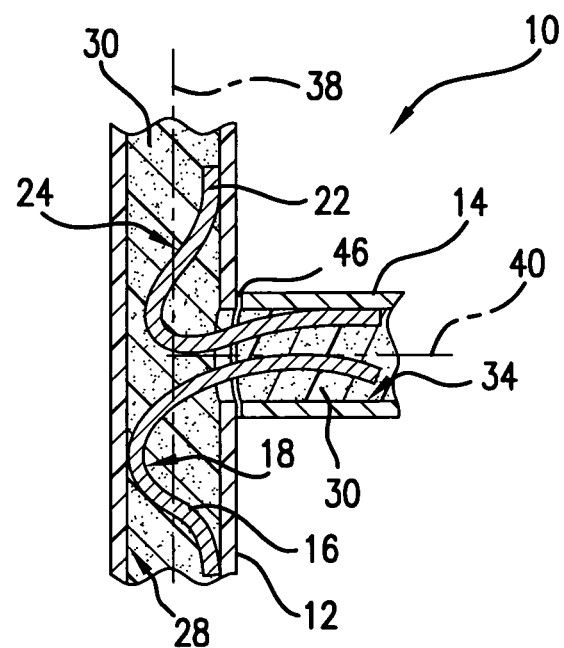
FIG. 7 is a cross-sectional view of a joint assembly in accordance with yet another exemplary embodiment.

An alternative exemplary embodiment of the joint assembly 10 is shown in FIG. 7. Here, cavities 20, 26, 32 and 36 as described in previous embodiments are not present. The reinforcing members 16 and 22 are wires that are curved in shape and extend into both the first and second joint members 12 and 14. The reinforcing member 16 contacts the inner surface 28 of the first joint member 12 while second reinforcing member 22 contacts both the inner surface 28 and inner surface 34 of the second joint member 14. In other embodiments, reinforcing member 16 may also contact the inner surface 34.

The joint assembly 10 exhibits increased adhesion of the foam 30 to the joint members 12 and 14 through the selection of materials in their construction. Here, the joint members 12 and 14 are made of a combination of polyvinyl chloride and polyurethane and the foam 30 is polyurethane foam. The use of polyurethane in the joint members 12 and 14 increases the adhesion between these components and the polyurethane foam 30. The ratio of polyvinyl chloride to polyurethane in the joint members 12 and 14 may be set so that 95 parts of polyvinyl chloride are present to 5 parts polyurethane. In other embodiments, the joint members 12 and 14 have 100 parts of polyvinyl chloride to 5 parts polyurethane. Additional embodiments exist in which 75 to 95 parts of polyvinyl chloride are present to 5 parts polyurethane, and in which 95 to 125 parts of polyvinyl chloride are present to 5 parts polyurethane.

Polyurethane may be added to the joint members 12 and 14 by granulating reacted thermoset polyurethane foam into powdery foam and then adding to the polyvinyl chloride formulation. Although described as being incorporated into both the first and second joint members 12 and 14, polyurethane may be added to only one of the joint members 12 or 14 in other embodiments. Additionally, the joint members 12 and/or 14 may be made of other materials in addition to polyvinyl chloride and polyurethane.

The joint assembly 10 can be treated or formed in a variety of different ways in order to increase adhesion of the foam 30 to other components. In one method of treatment, an electric current is applied to the inner surface 28 of the first joint member 12. Application of the electric current lowers the dielectric value of the first joint member 12. The foam 30 that is used may be a settable expanded foam that will better wet the inner surface 28 though a lowering of its dielectric value to result in better adhesion thereto. An alternative or additional treatment involves applying a solvent for polyvinyl chloride such as acetone or an etching primer for polyvinyl chloride to the inner surface 28. This treatment lowers the dielectric value of the first joint member 12 and promotes physical and chemical adhesion between the foam 30 and the inner surface 28. Although described as treatment methods to the inner surface 28, the inner surface 34 of the second joint member 14 can also be treated in similar fashions to improve adhesion with the foam 30.

Figure 8:
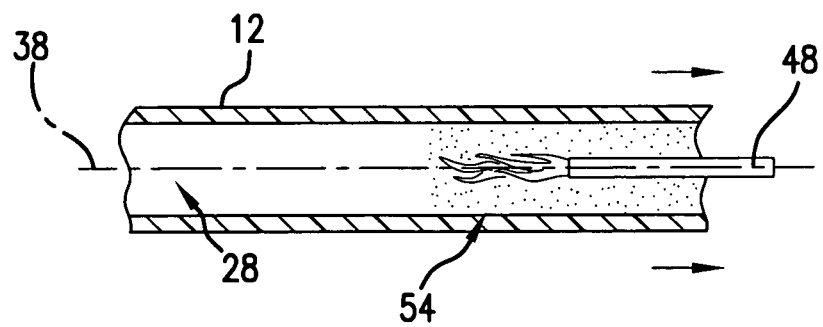
FIG. 8 is a cross-sectional view that shows a step of a method of forming the joint assembly in accordance with another exemplary embodiment in which an inner surface of the first joint member is heated by a heating rod.

The first joint member may also be heat treated in order to promote adhesion between the foam 30 and the inner surface 28. FIG. 8 shows a step in accordance with one method of treating the first joint member 12. The first joint member 12 may be extruded and cut into sections that are approximately 2 meters in length. Subsequently, the first joint member 12 is pulled over a thin metal heating rod 48 which emits a flame of roughly the same length. The flame may be approximately 1200° Fahrenheit in one embodiment. Heat applied to the inner surface 28 when pulling the first joint member 12 over the heating rod 48 changes the surface tension of the inner surface 28 which improves the bond between the inner surface 28 and the foam 30 when applied. FIG. 8 shows a portion 54 of the inner surface 28 that is passed over the heating rod 48 so that the surface tension thereof is changed. It is to be understood that the inner surface 34 can also be heat treated in a similar fashion to improve adhesion between the foam 30 and the second joint member 14.

An additional method of treatment resides in heating various components of the joint assembly 10 before introducing the foam 30. Here, individual components of the joint assembly such as the first joint member 12, second joint member 14, reinforcing member 16 and the second reinforcing member 22 are heated to a temperature of 107° Fahrenheit. Heating of these components may be accomplished by placing them into a heating oven. Additionally, the foam 30 can be added to the other components of the joint assembly 10 while in a temperature regulated room. The foam 30 may react at a faster rate with material that is at a temperature of 107° Fahrenheit so that enhanced adhesion is realized. Although a temperature of 107° Fahrenheit is described, the temperature may be up to 125° Fahrenheit in other embodiments.

The aforementioned designs and methods of constructing or treating the joint assembly 10 may be used separate from one another or may be combined in any combination. For example, the joint assembly 10 may include cavities 20, 26, 32 and 36 in addition to applying a heat treatment to the inner surfaces 28 and 34 to increase adhesion of the foam 30 with the various components. Alternatively, the joint assembly 10 may be constructed so that one or more of the various designs or methods of increasing adhesion is provided to the first joint member 12 while the second joint member 14 is not designed or treated in the described fashions to exhibit better adhesion.

EXPERIMENTS CARRIED OUT IN ACCORDANCE WITH VARIOUS EXEMPLARY EMBODIMENTS

Experiments were conducted in order to ascertain the performance of a structure upon using one or more of the arrangements or methods disclosed herein as compared to prior structures.

In one experiment carried out in accordance with one exemplary embodiment of the present invention, a polyvinyl chloride pipe was used that was produced from Kwalu having offices located at 1835 Savoy Drive, Suite 200, Atlanta, Ga. 30341, USA. The experiment was conducted in Kwalu's facilities in Matamoros, Mexico. The polyvinyl chloride pipe had an outer diameter of 35 millimeters and a wall thickness of 3 millimeters. The polyvinyl chloride pipe was cut to a length of 1 meter. A steel rod having a 10 millimeter diameter and a 1 meter length was inserted into the polyvinyl chloride pipe. Electric current was applied in order to lower the dielectric value of the assembly as previously discussed to promote better adhesion of foam. A mixture of polyurethane expanding foam produced by Kwalu was disposed within the polyvinyl chloride pipe. The polyurethane expanding foam is the type of foam used in Kwalu chair production and was allowed to cool completely after application. The assembly was then subjected to a test procedure in order to ascertain its strength.

A test instrument was provided that included a pneumatic cylinder used to impart a force in order to deflect the assembly. The assembly was supported by a steel I-beam. In this regard, the assembly and I-beam were arranged in a lengthwise, parallel relationship to one another. The assembly was supported on either end by posts extending up from the I-beam. The assembly was spaced a distance of 155 millimeters above the I-beam. Force from the pneumatic cylinder was applied to the center of the assembly located essentially halfway between the posts supporting the assembly. The force from the pneumatic cylinder acted to push the assembly towards the I-beam. A programmable logic controller (PLC) was provided and was used to control the number of cycles of force applied by the pneumatic cylinder during the testing procedure. An air pressure regulator was attached to the pneumatic cylinder and functioned to allow for the desired force to be obtained.

One test procedure in accordance with one exemplary embodiment involved setting the air pressure regulator to 35 psi which resulted in a pushing force of approximately 290 pounds as supplied by the pneumatic cylinder. The assembly was supported at opposite ends above the steel I-beam and pressure from the pneumatic cylinder was applied to the assembly for 5 seconds. A measurement of the deflection of the assembly was then recorded. 5 measurements of deflection were recorded.

The programmable logic controller was set for a specific number of cycles to test. After the completion of each test run, 5 measurements of the deflection of the assembly were recorded. Tests were conducted on the assembly in the aforementioned manner for 50 cycles, 100 cycles, 200 cycles, 500 cycles and 1000 cycles. The deflection of the assembly was measured as stated after each of the sets of cycles. Structural failure of the assembly at any point of the testing was noted as having a deflection of 155 millimeters and the broken assembly was removed and the experimented proceeded to the subsequent test.

Applicant theorizes that the strength of prior assemblies was limited due to weakness in the bonding between polyurethane foam and the resin outer shell after repeated application of stresses. Once the bonding is broken the laminate effect is no longer available to impart strength into the overall assembly and the strength of the assembly therefore depends upon the strength of the individual components, and a synergistic increase of the strength due to the laminate effect is not realized. Prior assemblies thus suffered from a breakdown of the laminar structure between the polyvinyl chloride shell and foam. Use of the method disclosed in the present application, that is application of an electric current, resulted in a 34% increase in strength versus assemblies previously constructed not using the disclosed method after 1000 cycles of stress testing. In this regard, strength is measured by the gain/loss of rigidity of the assembly and the failure of the assembly resulting in separation of the assembled components.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed:

1. A joint assembly, comprising:
a first joint member that has an axis;
a second joint member connected to said first joint member;
a bendable internal reinforcing member located within and enclosed by both said first joint member and said second joint member, said reinforcing member having an outer surface and a plurality of cavities that extend past the outer surface into an interior of said reinforcing member, wherein an inner surface of said reinforcing member defines said plurality of cavities, wherein said reinforcing member is made of the same material from said inner surface of said reinforcing member that defines said plurality of cavities to a center of said reinforcing member, wherein an outer perimeter of the material making up said reinforcing member has different sizes at different locations along a length of said reinforcing member from a terminal end of said reinforcing member to an opposite terminal end of said reinforcing member, wherein said terminal end of said reinforcing member is located in said first joint member and wherein said reinforcing member has a bend and wherein the axis of said first joint member extends through said center of said reinforcing member from said bend to said terminal end of said reinforcing member located in said first joint member such that the axis engages only the reinforcing member from said bend to said terminal end of said reinforcing member; and
foam inserted and set in both said first joint member and said second joint member and around said reinforcing member, said foam engaging said reinforcing member such that said foam is located in said cavities of said reinforcing member, wherein said foam engages said reinforcing member such that said reinforcing member is surrounded by the foam on all sides and is contacted only by said foam and by no other components and such that said reinforcing member is free from direct engagement with said first joint member and said second joint member.

2. The joint assembly as in claim 1, wherein said reinforcing member is a wire, wherein said wire is acid etched in order to form said cavities, and wherein acid etching of said wire lowers the dielectric value of said wire in order to promote wetting of said foam.

3. The joint assembly as in claim 1, further comprising:
a second internal reinforcing member located within and enclosed by both said first joint member and said second joint member, said second reinforcing member having an outer surface that defines a plurality of cavities, wherein said foam is located in said cavities of said second reinforcing member;
wherein said first joint member and said second joint member are tubes made of polyvinyl chloride, and
wherein said foam is polyurethane foam.

4. The joint assembly as in claim 1, wherein said first joint member and said second joint member are integrally formed with one another.

5. A joint assembly, comprising:
a first joint member comprising a cut extruded section having a length, the first joint member having an inner surface and an outer surface, wherein said first joint member is made from materials that include at least polyvinyl chloride and polyurethane;
a second joint member connected to said first joint member, said second joint member having an inner surface;
a reinforcing member located in both said first joint member and said second joint member; and
polyurethane foam located in both said first joint member and said second joint members, said polyurethane foam engaging said inner surfaces of said first joint member and said second joint member;
a bond formed between said polyurethane foam and said inner surface of said length of said cut extruded section of said first joint member wherein said inner surface of said length of said cut extruded section of said first joint member has been heat treated to have a different surface tension than said outer surface of said length of said cut extruded section of said first joint member before said polyurethane foam is applied within said first joint member to strengthen the bond between said polyurethane foam and said inner surface that has been treated.

6. The joint assembly as in claim 5, wherein said second joint member is made from materials that include at least polyvinyl chloride and polyurethane.

7. The joint assembly as in claim 5, wherein the ratio of polyvinyl chloride to polyurethane in said first joint member is 95 parts polyvinyl chloride to 5 parts polyurethane.

8. A joint assembly, comprising:
a first joint member having an inner surface;
a second joint member connected to said first joint member, wherein said second joint member has an inner surface;
a bendable internal reinforcing member located within and enclosed by both said first joint member and said second joint member, wherein a terminal end of said reinforcing member is located in said first joint member, wherein said reinforcing member has a center and a bend, and wherein said center extending from said terminal end in a direction towards said bend is parallel with said inner surface of said first joint member and is a portion of said reinforcing member;
foam inserted and set in both said first joint member and said second joint member and around said reinforcing member such that said foam engages said inner surfaces of said first joint member and said second joint member, wherein said foam engages said reinforcing member such that said reinforcing member is surrounded by the foam on all sides and is contacted only by said foam and by no other components and such that said reinforcing member is free from direct engagement with said first joint member and said second joint member; and
an area increasing joint strengthening feature selected from the group consisting of a plurality of cavities on an outer surface of said reinforcing member into which said foam is located, a plurality of cavities on said inner surface of said first joint member into which said foam is located, and a curved feature of said reinforcing member.

\* \* \* \* \*